United States Patent Office 3,794,670
Patented Feb. 26, 1974

3,794,670
PREPARATION OF ORGANOTIN COMPOUNDS
Donald J. Peterson, Springfield Township, Hamilton County, Ohio, assignors to The Procter & Gamble Company, Cincinnati, Ohio
No Drawing. Filed June 30, 1971, Ser. No. 158,528
Int. Cl. C07f 7/22
U.S. Cl. 260—429.7       13 Claims

ABSTRACT OF THE DISCLOSURE

A process for preparing (organosulfonylmethyl)triorganotin compounds by reacting a triorganotin amine and an organosulfonylmethyl compound. The resulting products are useful as pesticides and seed protecting agents.

BACKGROUND OF THE INVENTION

This invention relates to a process for the preparation of (organosulfonylmethyl)triorganotin compounds. The resulting (organosulfonylmethyl)triorganotin compounds are useful in a variety of agricultural applications.

The necessity of controlling or eradicating unwanted insect pests by means of chemical agents is clearly accepted. Another broad class of chemical agents important for use in agriculture are the antifungal seed protectors which serve to increase seed germination and crop yields. A variety of chemicals, including certain organotin compounds, have been previously disclosed for use as pesticides and seed protectors. The copending application of Peterson, entitled "Novel Organotin Compounds," Ser. No. 10,303, filed Feb. 10, 1970, relates to the use of certain (organosulfonylmethyl)triorganotin compounds as pesticides. The concurrently filed application of Peterson, entitled "Seed Protector," Ser. No. 158,529 filed June 30, 1971, discloses the use of (organosulfonylmethyl)triorganotin compounds as seed protectors. It may therefore be seen that the (organosulfonylmethyl)triorganotin compounds are useful in a wide variety of important agricultural and industrial applications. Heretofore, the (organosulfonylmethyl)triorganotin compounds have been prepared by a multi-step Grignard process which is both time consuming and relatively expensive. For this reason, it is desirable that a simple, inexpensive process for preparing (organosulfonylmethyl)triorganotin compounds on an industrial scale be devised.

Accordingly, it is an object of this invention to provide a simple, inexpensive process for preparing (organosulfonylmethyl)triorganotin compounds. This and other objects are obtained by this invention as will be seen from the following disclosure.

SUMMARY OF THE INVENTION

The present invention encompasses a process for preparing (organosulfonylmethyl) triorganotin compounds comprising: (1) admixing a triorganotin amine compound of the formula $(R_3Sn)_xNR'_{3-x}$ wherein $x$ is an integer from 1 to 3, and wherein R and R' are as defined hereinafter, with an organosulfonylmethyl compound of the formula $RSO_2CH_3$, wherein R is as defined hereinafter; and (2) heating the mixture obtained from step (1) at a temperature above about 40° C. and recovering the (organosulfonylmethyl)triorganotin compound.

DETAILED DESCRIPTION OF THE INVENTION

According to the present invention it has been discovered that triorganotin amines can be reacted with organosulfonylmethyl compounds to yield the desired (organosulfonylmethyl)triorganotin compounds. The general reaction is as follows:

$$(R_3Sn)_xNR'_{3-x} + xRSO_2CH_3 \xrightarrow{\text{Heat}} xR_3SnCH_2SO_2R + R'_{(3-x)}HN$$

wherein $x$ is an integer from 1 to 3 and wherein each R can be the same or different and include alkyl from $C_1$ to about $C_{20}$, cycloalkyl ($C_4$ to $C_{20}$), aryl (for example, phenyl, naphthyl and phenanthryl) as well as substituted alkyl and aryl wherein the substituents include halogen, e.g., fluoride, chloride, bromide and iodide, alkyl, aryl, cycloalkyl, dialkylamino, alkoxyl, and the like, and wherein R' is as disclosed hereinafter. Trialkyltin amines (alkyl $C_1$ to $C_{20}$) are preferred in this process; the tributyltin amines are especially preferred.

The triorganotin amine compounds used in the present process can be prepared by reacting the alkali metal salts of ammonia and primary and secondary amines with triorganotin halides, e.g., triorganotin fluorides, chlorides, bromides and iodides, which are commercially available. The alkali metal salts of primary and secondary amines and ammonia are themselves prepared by reacting said amines with the corresponding metals in the manner well-known to those skilled in the art. For example, ammonia will react with sodium to yield sodamide which, in turn, will react with a triorganotin halide to prepare the corresponding triorganotin amine. Dimethylamine will react with lithium metal in the presence of a conjugated diene such as butadiene to form lithium dimethylamide, which, in turn, reacts with a triorganotin halide to form the N,N-dimethylaminotriorganotin compound. Alternatively, various amines can be metalated in standard formation with, for example, organolithium compounds to provide the metal amine salts. In general terms, the preparation of the triorganotin amines useful herein is represented by the following reaction sequence:

$$R'_2NH + C_4H_9M \rightarrow R'_2NM + C_4H_{10}$$

or, $$2R'_2NH + 2M \rightarrow 2R'_2NM + H_2$$

then, $$R'_2NM + R_3SnX \rightarrow R'_2NSnR_3 + MX,$$

wherein M is alkali metal, i.e., lithium, sodium, potassium, rubidium, and cesium; wherein each R' is hydrogen, alkyl, cycloalkyl ($C_4$ to $C_{20}$) or substituted alkyl; R is as defined above; and X is a halogen, i.e, fluoride, chloride, bromide and iodide. It will be recognized that when primary amines, secondary amines and ammonia are used herein, triorganotin amines of the formula $R_3SnNR'_2$, $(R_3Sn)_2NR'$ and $(R_3Sn)_3N$ are formed. These are all useful in the present process. Sodium is a preferred alkali metal for use in preparing the alkali metal salts of the amine. Any nitrogenous compound having an N—H bond capable of reacting with a metalating agent to form an alkali metal amine salt is suitable for preparing the triorganotin amines used herein. Exemplary amines used in this procedure include methylamine, dimethylamine, ethylamine, diethylamine, decylamine, di-decylamine, cyclo-hexylamine, di-cyclohexylamine, chloromethylamine, and isopropylamine, as well as ammonia. Especially preferred herein are ammonia, methylamine, dimethylamine and diethylamine, for economic reasons.

The triorganotin halides suitable for preparing the triorganotin amines used herein are commercially available. Such compounds are prepared, for example, by reacting an organometallic compound with a tin tetrahalide in the manner well-known to those skilled in the art. Exemplary triorganotin halides suitable for preparing the triorganotin amines used in the present process include trimethyltin chloride, triethyltin bromide, tripropyltin fluoride, tributyltin chloride, triphenyltin iodide, trinaphthyltin chloride, tri-(p-tolyl)tin chloride, tri-(m-methoxyphenyl)tin iodide, triseicosyltin chloride and the like. The trialkyltin chlorides are preferred for economic reasons. Tributyltin chloride is most preferred herein.

From the foregoing it may be seen that a variety of triorganotin amines useful in the present process can be readily prepared using standard techniques. Preferred triorganotin amines used in the present process are the trialkyltin amines, especially the bis(trialkyltin) amines [($R_3$Sn)$_2$NH], tris-(trialkyltin)amines [($R_3$Sn)$_3$N], bis-(trialkyltin)-N-methylamines [($R_3$Sn)$_2$NCH$_3$], aminotrialkyltins ($R_3$SnNH$_2$), N-methylaminotrialkyltins

and N,N-dimethylaminotrialkyltins [$R_3$SnN(CH$_3$)$_2$]. Of these, the compounds wherein R is butyl, e.g., aminotributyltin, N-methylaminotributyltin, N,N-dimethylaminotributyltin, bis-(tributyltin)amine, tris-(tributyltin)amine and bis-(tributyltin)-N-methylamine, are preferred. When ease of preparation and handling are of primary concern, N,N-diethylaminotributyltin or N,N-dimethylaminotributyltin are preferably used. For economy, tris-(tributyltin)amine is preferred.

The organosulfonylmethyl compounds used herein are of the formula RSO$_2$CH$_3$, wherein R is as above; these dimethyl sulfone compounds are commercially available. Alternatively, the organosulfonylmethyl compounds can be prepared in well-known fashion by the oxidation of methylsulfides of the formula RSCH$_3$, using, for example, hydrogen peroxide in glacial acetic acid, sodium hypochlorite, or potassium permanganate at elevated temperatures, as oxidizing agents. Dimethyl sulfone, n-butyl methyl sulfone, n-octyl methyl sulfone, phenyl methyl sulfone, naphthyl methyl sulfone, phenanthryl methyl sulfone, eicosyl methyl sulfone, isopropyl methyl sulfone, p-chlorophenyl methyl sulfone, o-N,N-dimethylaminophenyl methyl sulfone, and the like, are suitable for use in the present process. Especially preferred for use herein are phenyl methyl sulfone and n-butyl methyl sulfone.

The process herein is generally carried out by admixing the triorganotin amine with the organosulfonyl-methyl compound at a mole ratio of from about 1:100 to 100:1, preferably, about 1:1; heating the reaction at a temperature above about 40° C. for a period from about 1 to about 12 hours; and recovering the desired (organosulfonyl-methyl)triorganotin compound by crystallization, chromatography or distillation, depending on the physical form of the compound being prepared. For example, liquid (organosulfonylmethyl)triorganotin compounds are generally recovered by distillation while the solid (organosulfonylmethyl)triorganotin compounds are readily recovered by column chromatography or crystallization.

While the process of this invention can be carried out in the absence of solvent, it is sometimes convenient to use a solvent or suspending liquid herein. Any of the common organic solvents can be used for this purpose, including for example, hexane, benzene, toluene, xylene, and the like. Mixtures such as the petroleum ethers and the glyme solvents are also suitable. Preferred herein are anhydrous aprotic organic liquids, especially hexane. Sufficient liquid is used to dissolve or disperse the reactants.

The reaction temperature in this process is not critical except that the temperature should be above about 40° C., more preferably from about 50° C to about 100° C., to insure that the reaction will occur at a reasonable rate. Likewise, the reaction is initiated almost immediately and the reaction time employed will vary with temperature, the amount of tin amine being reacted with the organosulfonylmethyl compound, and the like. Usually, from about 10 minutes to 24 hours per mole of (organosulfonylmethyl)triorganotin compound being prepared is sufficient.

The following examples are included herein to more fully illustrate the present process but are not intended to be limiting thereof.

Example I

Diethylamine (73 g.; 1 mole) was dissolved in n-hexane. A solution comprising 500 ml. of 1.6 molar butyllithium in n-hexane was added dropwise by syringe to the amine-hexane mixture. The reaction mixture was cooled with an ice-water bath during the course of addition. After addition of the butyllithium (0.8 moles) was complete, 260 g. (0.8 moles) of tributyltin chloride was added dropwise to the hexane suspension of lithium N,N-diethyl amide (cooled with ice). Following addition of the tributyltin chloride, the reaction mixture was stirred for an additional one hour.

Phenyl methyl sulfone (125 g.; 0.8 moles) was added to the reaction mixture prepared above, which comprised the N,N-diethylaminotributyltin in hexane. After the addition of the phenyl methyl sulfone, the mixture was heated to distill hexane and diethylamine. After about one hour at 75° C., an aliquot was removed and chromatographed and indicated about 80% formation of the desired (phenylsulfonylmethyl)tributyltin. Remaining solvent was stripped and the reaction temperature was maintained at 80° C. to 110° C. for about 4 hours. The reaction product was then cooled and poured into 1 liter of water containing 0.2 moles of HCl and extracted with diethyl ether. The diethyl ether extract was dried over magnesium sulfate, filtered and the ether evaporated to leave 343 g. of residue which was distilled through a large bore, short path still. Product distilling at about 170–172° C. at 0.06 mm. (pot temp. 195–200° C.) proved to be the (phenylsulfonylmethyl)tributyltin.

In the above procedure, the tributyltin chloride is replaced by an equivalent amount of trimethyltin bromide, triphenyltin chloride, tris-eicosyltin chloride, tricyclohexyltin fluoride, and trinaphthyltin iodide, respectively. The compounds (phenylsulfonylmethyl)trimethyltin, (phenylsulfonylmethyl)triphenyltin, (phenylsulfonylmethyl)trieicosyltin, (phenylsulfonylmethyl)tricyclohexyltin and (phenylsulfonylmethyl)trinaphthyltin are thereby secured.

In the above procedure, the hexane solvent is replaced by an equivalent volume of benzene, petroleum ether and diethyl ether, respectively, and equivalent results are secured.

Example II

A 500 ml. flask (3-neck) fitted with a cold finger condenser cooled with a Dry-Ice acetone mixture and blanketed with argon was used in this procedure. Anhydrous ammonia gas was condensed in the reaction flask (ca. 300 ml. liquified gas). 0.08 g. of iron (III) chloride and 2.57 g. of sodium metal were added to the flask portionwise over 30 minutes. After hydrogen evolution had ceased, tributyltin chloride (~0.1 mole) was added dropwise; a black oily material [mixture of mono-, bis- and tris-(tributyltin)amine] was formed. Diethyl ether was added to disperse the oily material and 0.1 mole of phenyl methyl sulfone was added to the reaction vessel. The reaction mixture was stirred for about 30 minutes and the ammonia and ether were allowed to evaporate, leaving a black residue. This residue was stirred and heated at about 100° C. for approximately 5 hours. The mixture was washed with 500 ml. of 1.0 N HCl and 100 ml. of 1 M NH$_4$Cl and extracted with 3× 200 ml. portions of diethyl ether. The ether was evaporated and the product was distilled in a semimicro fractionating column. The product, isolated in 50% yield, was identified as (phenylsulfonylmethyl)tributyltin.

In the above procedure, the ammonia gas is replaced by an equivalent amount of methylamine, dimethylamine, ethylamine and diethylamine, respectively, in the presence of 0.1 equivalent of 1,3-butadiene, and equivalent results are secured.

In the above procedure, the sodium metal is replaced by an equivalent amount of lithium metal and potassium metal, respectively, and (phenylsulfonylmethyl)tributyltin is secured.

Example III

To a mixture comprising 9 g. of dimethylamine in 100 ml. of dry hexane at 0° C. was added 100 ml. of 1.6 molar butyllithium in hexane at a rate such that the temperature remained less than about 10° C. The solution was stirred for one hour at ambient temperature. Tributyltin chloride (52.2 g.) was added dropwise to the stirred reaction at 10° C. and the reaction mixture was allowed to warm to room temperature with stirring for about one hour. The lithium chloride which had formed was filtered and the hexane removed by evaporation to yield N,N-dimethylaminotributyltin.

To a mixture comprising 33.4 g. of N,N-dimethylaminotributyltin, prepared above, was added 15.6 g. of phenyl methyl sulfone and the reaction mixture was heated to about 100° C. using an oil bath. After 2 hours of heating, (phenylsulfonylmethyl)tributyltin was distilled from the reaction flask at about 200° C. to 225° C. (pot temp.) at 0.03 mm.

In the above procedure, the phenyl methyl sulfone is replaced by an equivalent amount of butyl methyl sulfone, decyl methyl sulfone, cyclohexyl methyl sulfone and naphthyl methyl sulfone, respectively and the compounds (butylsulfonylmethyl)tributyltin, (decylsulfonylmethyl)tributyltin, (cyclohexylsulfonylmethyl)tributyltin and (naphthylsulfonylmethyl)tributyltin are thereby secured.

In the above procedure, the reaction of the N,N-dimethylaminotributyltin with the phenyl methyl sulfone is carried out at 40° C. and 250° C. (oil bath), respectively and equivalent results are secured in that (phenylsulfonylmethyltributyltin) is obtained in good yields.

What is claimed is:

1. A process for preparing (organosulfonylmethyl)triorganotin compounds comprising: (1) admixing a triorganotin amine compound of the formula $(R_3Sn)_xNR'_{3-x}$ wherein $x$ is an integer from 1 to 3, wherein R is alkyl, cycloalkyl, or aryl and wherein R' is alkyl, cycloalkyl or hydrogen, with an organosulfonylmethyl compound of the formula $RSO_2CH_3$, wherein R is alkyl, cycloalkyl, or aryl; and (2) heating the mixture obtained from step (1) at a temperature of above about 40° C. and recovering the (organosulfonylmethyl)triorganotin compound.

2. A process according to claim 1 wherein the triorganotin amine compound is a trialkyltin amine.

3. A process according to claim 1 wherein the triorganotin amine compound is a tributyltin amine.

4. A process according to claim 1 wherein the triorganotin amine compound is a member selected from the group consisting of bis-(trialkyltin) amine, tris-(trialkyltin)-amine, bis - (trialkyltin) - N-methylamine, aminotrialkyltin, N-methylaminotrialkyltin and N,N-dimethylaminotrialkyltin compounds.

5. A process according to claim 1 wherein the triorganotin amine compound is aminotributyltin.

6. A proces according to claim 1 wherein the triorganotin amine compound is N-methylaminotributyltin.

7. A process according to claim 1 wherein the triorganotin amine compound in N,N-dimethylaminotributyltin.

8. A process according to claim 1 wherein the triorganotin amine compound is bis-(tributyltin)amine.

9. A process according to claim 1 wherein the triorganotin amine compound in tris-(tributyltin)amine.

10. A process according to claim 1 wherein the triorganotin amine compound is bis-(tributyltin)-N-methylamine.

11. A process according to claim 1 wherein the organosulfonylmethyl compound is a member selected from the group consisting of phenyl methyl sulfone and butyl methyl sulfone.

12. A process according to claim 1 wherein the triorganotin amine compound is selected from the group consisting of N,N - diethylaminotributyltin, N,N - dimethylaminotributyltin, and tris-(tributyltin) amine and the organosulfonylmethyl compound is phenyl methyl sulfone.

13. A process according to claim 1 employing an anhydrous, aprotic organic liquid solvent.

References Cited
UNITED STATES PATENTS

| | | | |
|---|---|---|---|
| 2,604,483 | 7/1952 | Mack et al. | 260—429.7 |
| 3,399,146 | 8/1968 | Scanley | 260—429.7 |

WERTEN F. W. BELLAMY, Primary Examiner

U.S. Cl. X.R.

424—288